United States Patent
Croak et al.

(10) Patent No.: US 7,792,269 B2
(45) Date of Patent: Sep. 7, 2010

(54) METHOD AND APPARATUS FOR PROVIDING NETWORK ANNOUNCEMENTS ABOUT SERVICE IMPAIRMENTS

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1619 days.

(21) Appl. No.: 11/026,410

(22) Filed: Dec. 30, 2004

(65) Prior Publication Data

US 2006/0147023 A1 Jul. 6, 2006

(51) Int. Cl.
*H04M 7/10* (2006.01)
(52) U.S. Cl. .................. 379/221.11; 340/540; 370/352; 379/88.12; 704/249; 725/93
(58) Field of Classification Search ............... 379/88.12, 379/41, 88.11, 48, 51, 88.17, 114.01, 211.02, 379/221.11; 370/353–357, 352; 340/540; 704/249; 725/93
See application file for complete search history.

(56) References Cited

U.S. PATENT DOCUMENTS

| | | | |
|---|---|---|---|
| 6,324,265 B1 | 11/2001 | Christie et al. | |
| 6,891,942 B1 * | 5/2005 | Porter et al. | 379/211.02 |
| 6,928,150 B2 * | 8/2005 | Johnston | 379/114.01 |
| 6,952,416 B1 * | 10/2005 | Christie, IV | 370/354 |
| 7,136,919 B1 * | 11/2006 | Foncarnier | 709/224 |
| 7,180,986 B2 * | 2/2007 | Bettis et al. | 379/88.17 |
| 7,417,984 B1 * | 8/2008 | Croak et al. | 370/352 |
| 2003/0023440 A1 * | 1/2003 | Chu | 704/249 |
| 2003/0174693 A1 * | 9/2003 | Gallant et al. | 370/352 |
| 2004/0025186 A1 * | 2/2004 | Jennings et al. | 725/93 |
| 2004/0034793 A1 * | 2/2004 | Yuan | 713/200 |
| 2004/0086094 A1 * | 5/2004 | Bosik et al. | 379/88.12 |
| 2004/0165580 A1 * | 8/2004 | Stillman et al. | 370/352 |
| 2006/0147023 A1 * | 7/2006 | Croak et al. | 379/221.11 |
| 2006/0153162 A1 * | 7/2006 | Croak et al. | 370/352 |
| 2006/0233107 A1 * | 10/2006 | Croak et al. | 370/235 |
| 2009/0002156 A1 * | 1/2009 | Croak et al. | 340/540 |

OTHER PUBLICATIONS

Office Action for CA 2,531,404, Jan. 8, 2009, consist of 2 pages.
Office Action for CA 2,531,404, Sep. 30, 2009, consists of 2 pages.

* cited by examiner

*Primary Examiner*—Gerald Gauthier

(57) ABSTRACT

The present invention enables information about a service impacting network event to be collected from network operations and automatically conveyed to a Media Server that plays a network announcement to callers into network customer service center. The announcement can be played as an option on an Interactive Voice Response (IVR) menu and informs the caller of known service issues that are being addressed and estimates of when service should return to normal.

20 Claims, 5 Drawing Sheets

METHOD AND APPARATUS FOR PROVIDING NETWORK ANNOUNCEMENTS ABOUT SERVICE IMPAIRMENTS

The present invention relates generally to communication networks and, more particularly, to a method and apparatus for enabling network announcements about service impairments in packet switched networks, e.g. Voice over Internet Protocol (VoIP) networks.

BACKGROUND OF THE INVENTION

When network service providers experience customer impacting service disruptions in their network, the customer care agents need to understand what is happening in a way that allows them to explain it to customers, and to give customers an estimated time when service will be restored. Often network engineers in the heat of attempting to restore service disruptions neglect to keep the customer care agents well informed. There is also no automated method to relay the service impacting network event from the network management system to the customer care agents. This can lead to a high rate of customer dissatisfaction and frustration as customers are forced into long queues to be put on hold and then receive less than clear information about the problems they are experiencing.

Therefore, a need exists for a method and apparatus for enabling network announcements about service impairments in packet switched networks, e.g. VoIP networks.

SUMMARY OF THE INVENTION

In one embodiment, the present invention enables information about a service impacting network event to be collected from network operations and automatically conveyed to a Media Server that plays a network announcement to callers that call into the network customer service center. The announcement can be played as an option on an Interactive Voice Response (IVR) menu and informs the caller of known service issues that are being addressed and estimates of when service should return to normal. This invention decreases calls to live customer care agents, and helps customers understand the nature of the difficulty they are experiencing, thereby increasing customer satisfaction and decreasing customer frustration. Broadly defined, a Media Server (MS) is a special server that typically handles and terminates media streams, and to provide services such as announcements, bridges, transcoding, and Interactive Voice Response (IVR) messages.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
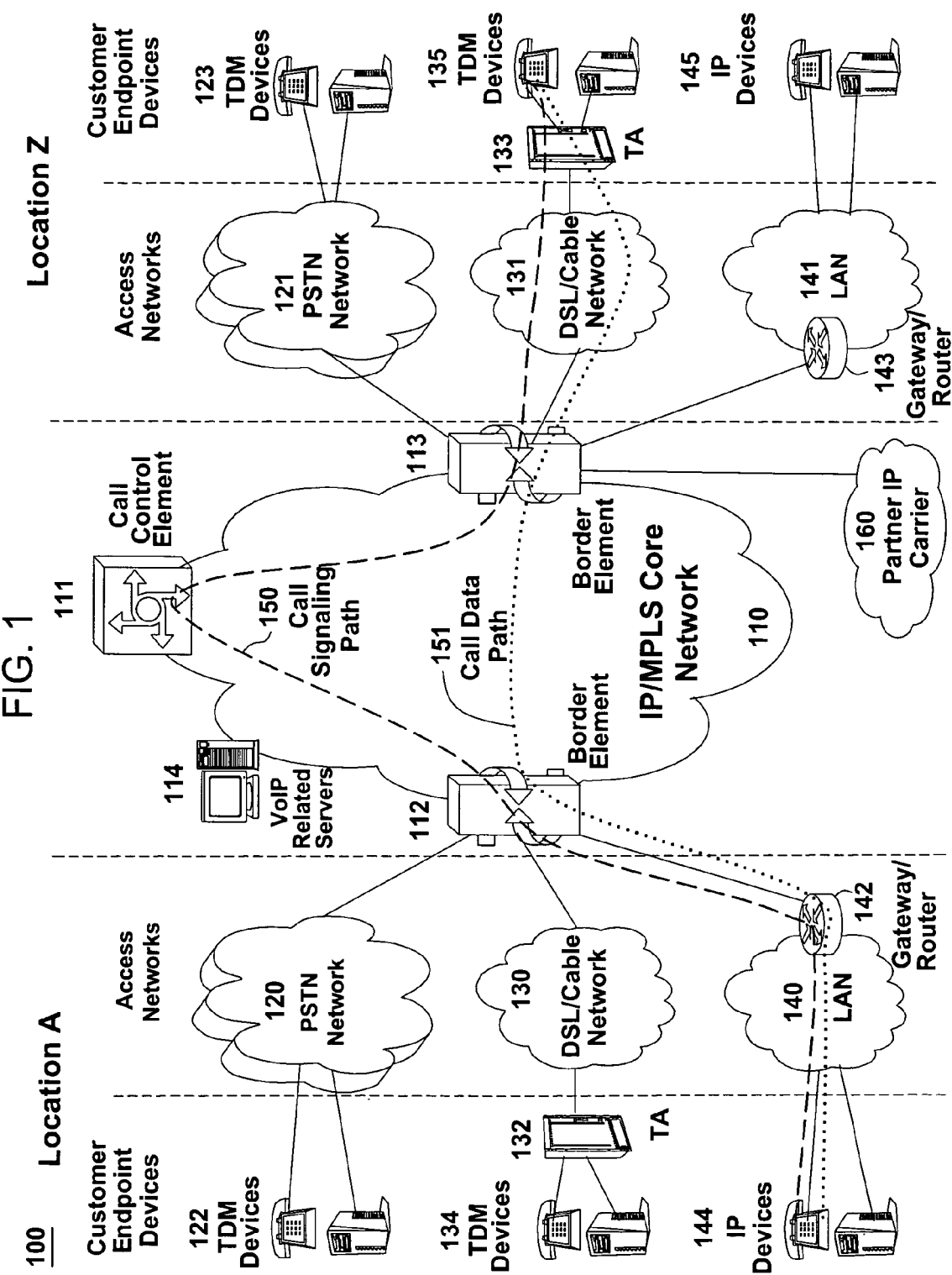
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

When network service providers experience customer impacting service disruptions in their network, the customer care agents need to understand what is happening in a way that allows them to explain it to customers, and to give customers an estimated time when service will be restored. Often network engineers in the heat of attempting to restore service disruptions neglect to keep the customer care agents well informed. There is also no automated method to relay the service impacting network event from the network management system to the customer care agents. This can lead to a high rate of customer dissatisfaction and frustration as customers are forced into long queues to be put on hold and then receive less than clear information about the problems they are experiencing.

To address this criticality, the present invention enables information about a service impacting network event to be collected from network operations and automatically conveyed to a Media Server that plays a network announcement to callers that call into the network customer service center. The announcement can be played as an option on an Interactive Voice Response (IVR) menu and informs the caller of known service issues that are being addressed and estimates of when service should return to normal. This invention decreases calls to live customer care agents, and helps customers understand the nature of the difficulty they are experiencing, thereby increasing customer satisfaction and decreasing customer frustration. Broadly defined, a Media Server (MS) is a special server that typically handles and terminates media streams, and to provide services such as announcements, bridges, transcoding, and Interactive Voice Response (IVR) messages.

Figure 2:
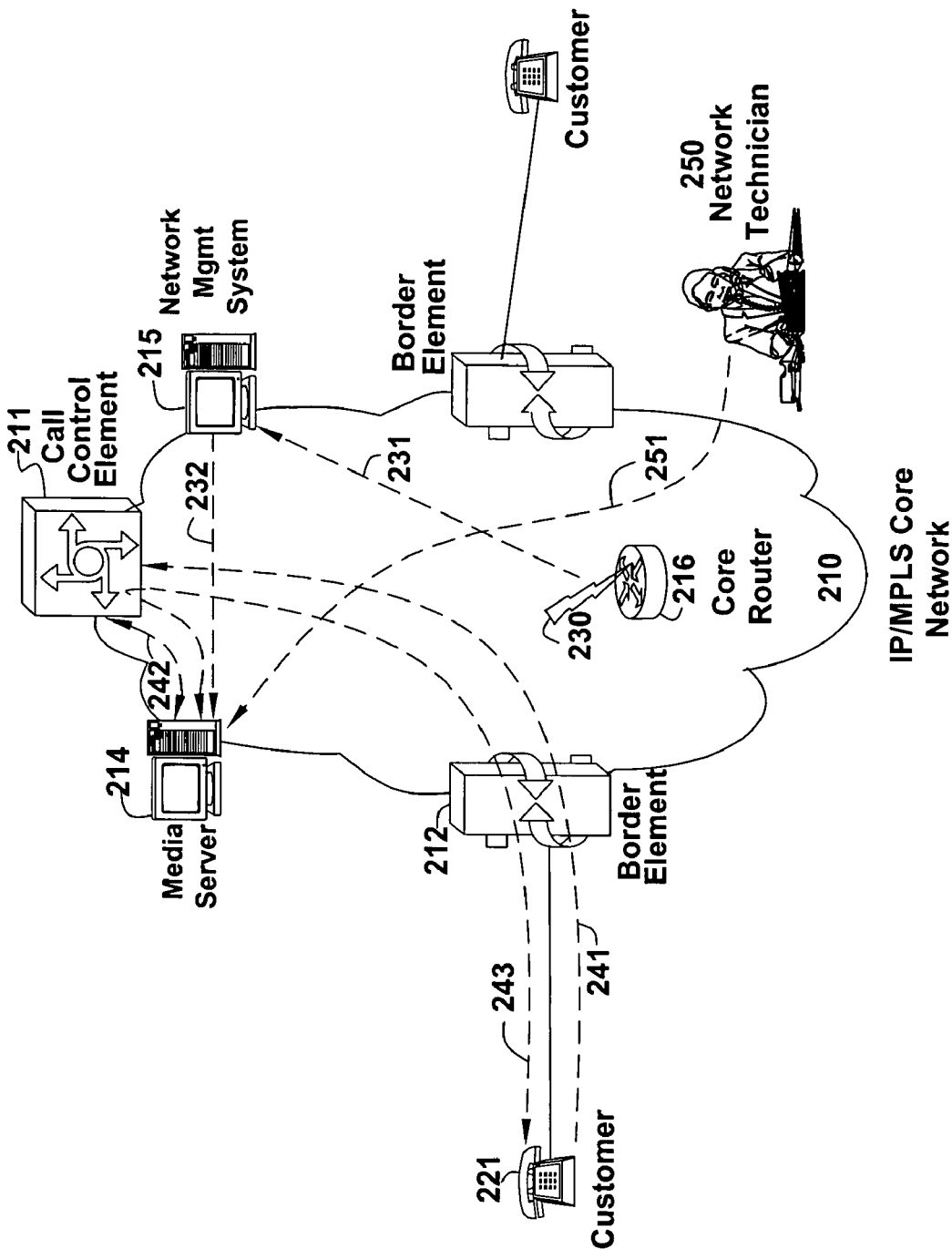
FIG. 2 illustrates an example of enabling network announcements about service impairments in a VoIP network of the present invention.

FIG. 2 illustrates an example of enabling network announcements about service impairments in a packet switched network, e.g., a VoIP network. In FIG. 2, core router 216 experiences a service impacting event 230 and raises an alarm 231 associated with the event to Network Management System (NMS) 215. NMS 215 is under the control of the network operator. The received alarm type and severity indicates the associated network event is service impacting, NMS 215 then sends the information related to the service impacting network event to Media Server (MS) 214 via flow 232 so that a network announcement related to this network event can be created. A Media Server (MS) is a special server that typically handles and terminates media streams, and to provide services such as announcements, bridges, transcoding, and Interactive Voice Response (IVR) messages. Upon receiving the service impacting network event information, a network announcement is created and will be automatically played as an IVR option to calling customers informing them of the occurrence of the event and its status. In addition, once the automated service impacting network event information is stored in the MS, the network technician, 250, who is restoring the failed network component can also access MS 214, flow 251, to update the network announcement to convey the latest status of the service impacting network event information, such as estimated service restoration time.

When a customer, 221, calls the network customer service number, flow 241, CCE 211 requests MS 214, flow 242, to offer an IVR menu to the calling customer with an option to obtain information related to existing service impacting network events. If the customer chooses the option to listen to this information, the stored network announcement of the service impacting network event which is created automatically by the network or updated manually by the network technician, will be played to the calling customer. CCE 211 will relay, using flow 243 via BE 212, the requested information from MS 214 to be played to the calling customer.

Figure 3:
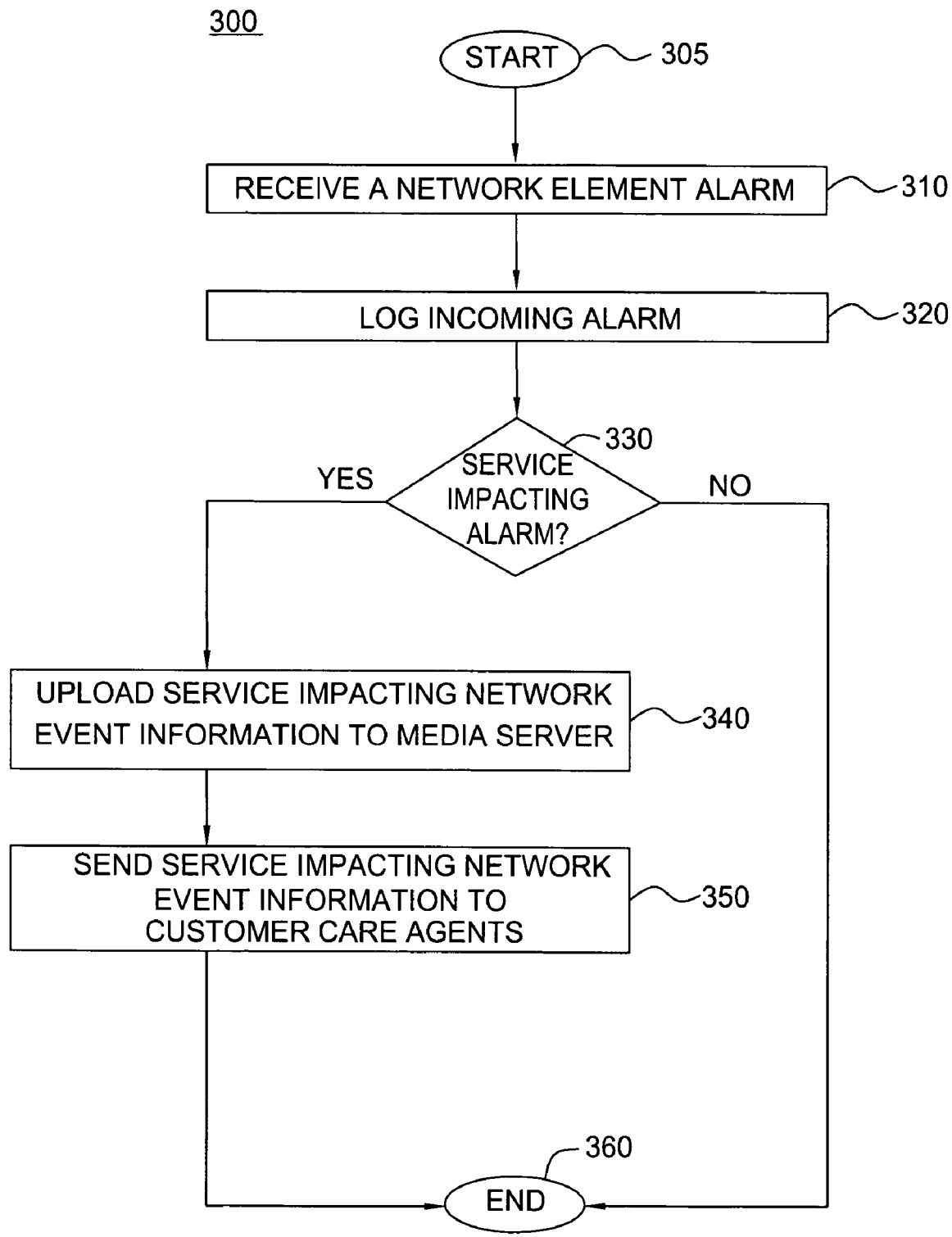
FIG. 3 illustrates a flowchart of a method for collecting service impacting network event information in a VoIP network of the present invention.

FIG. 3 illustrates a flowchart of a method for collecting service impacting network event information, e.g., by the NMS in a VoIP network. Method 300 starts in step 305 and proceeds to step 310.

In step 310, the method receives a network event alarm from a network element in the network. In step 320, the method logs the incoming alarm indication. In step 330, the method determines based on the alarm type and severity if the alarm is service impacting. If the alarm is service impacting, the method proceeds to step 340; otherwise, the method proceeds to step 360. In step 340, the method sends the service impacting network event alarm information to the MS. In step 350, the method sends the service impacting network event alarm information to customer service agents. There are various ways to send this information including the use of emails, IVR messages, or facsimile. The method ends in step 360.

Figure 4:
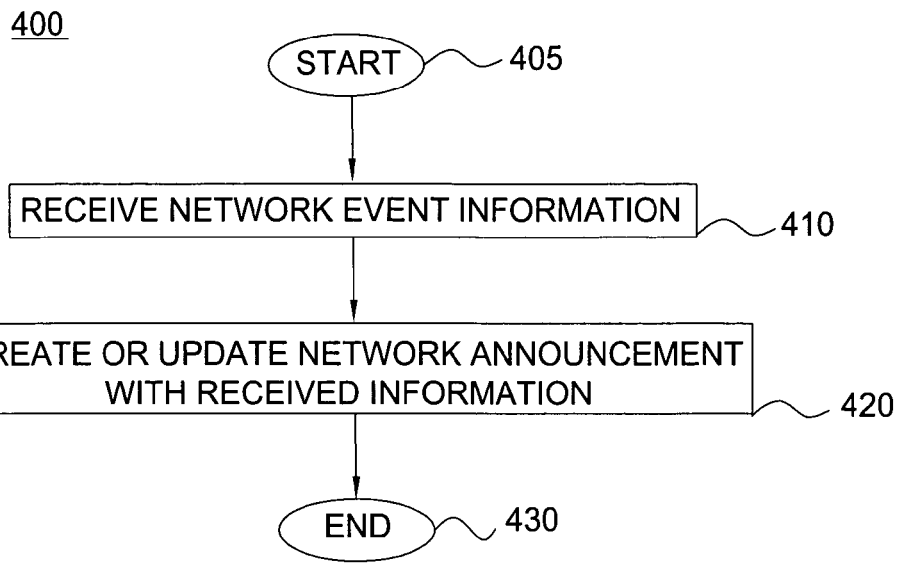
FIG. 4 illustrates a flowchart of a method for updating service impacting network event information network announcement in a VoIP network of the present invention.

FIG. 4 illustrates a flowchart of a method for updating service impacting network event information network announcement by the MS in a packet-switched network, e.g. a VoIP network. Method 400 starts in step 405 and proceeds to step 410.

In step 410, the method receives service impacting network event alarm information sent automatically by the NMS or service impacting network event status update sent manually by a network technician. In step 420, the method creates or updates the network announcement that will be used to convey information related to the service impacting network event status to calling customers. The method ends in step 430.

Figure 5:
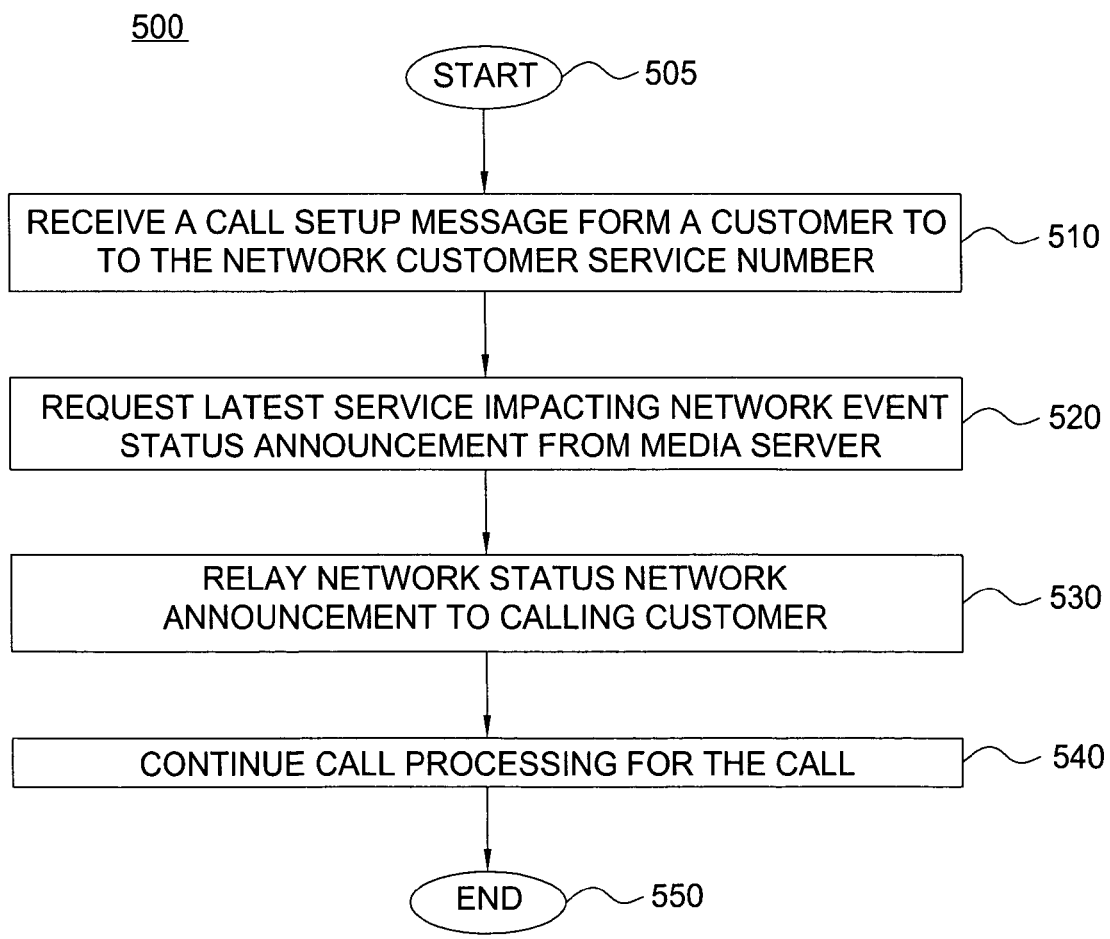
FIG. 5 illustrates a flowchart of a method for enabling network announcements about service impairments in a VoIP network of the present invention.

FIG. 5 illustrates a flowchart of a method for enabling network announcements about service impairments by the CCE in a packet-switched network, e.g. a VoIP network. Method 500 starts in step 505 and proceeds to step 510.

In step 510, the method receives a call setup message from a customer to the network customer service number. In step 520, the method sends a request to the MS to offer the calling customer a network announcement option to obtain the latest service impacting network event status. In step 530, the method relays the latest service impacting network event status to the calling customer. In step 540, the method continues the call processing procedures of the customer call. The method ends in step 550.

Figure 6:
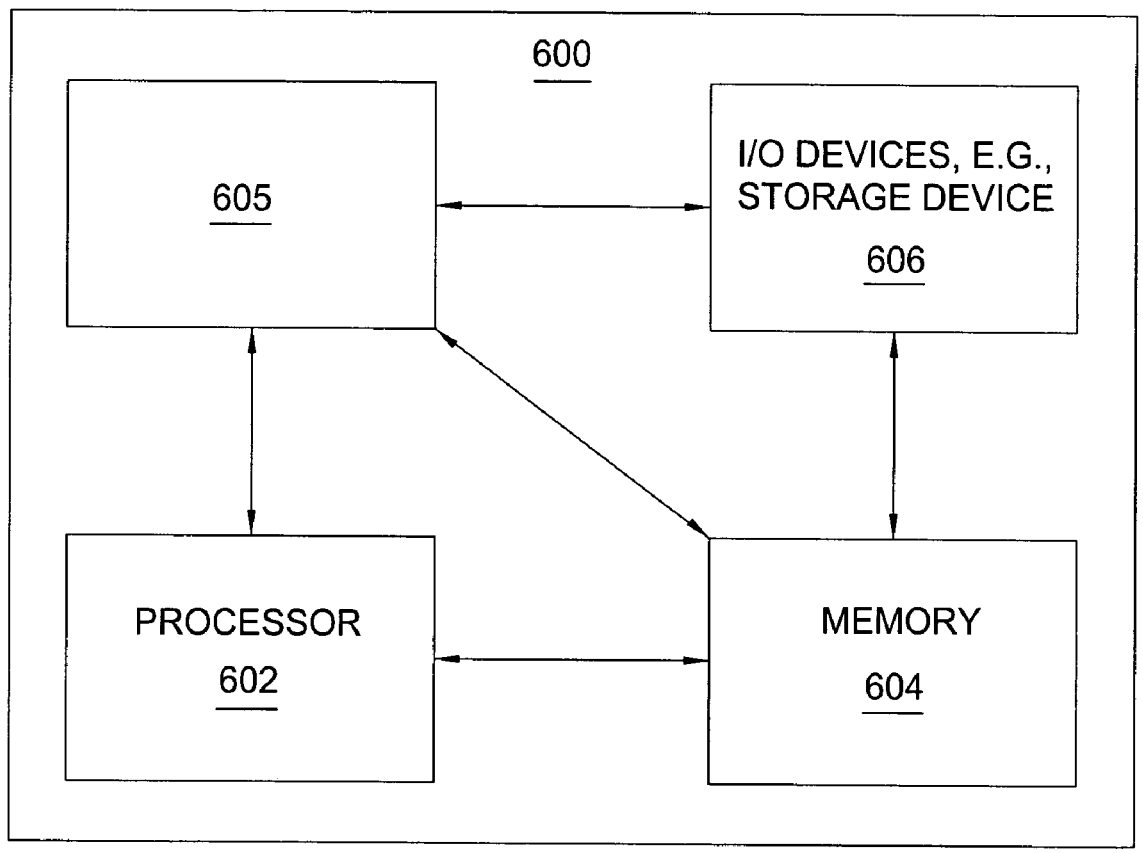
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a network announcement module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present network announcement module or process 605 can be loaded into memory 604 and executed by processor 602 to implement the functions as discussed above. As such, the present network announcement process 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing network announcements in a communication network, comprising:
    registering a service impacting network event alarm in said communication network;
    creating a network announcement associated with said service impacting network event alarm;
    receiving a call setup message to a customer service number from a calling party; and
    presenting said network announcement containing information about said service impacting network event alarm to said calling party in response to receiving said call setup message.

2. The method of claim 1, wherein said communication network is a Voice over Internet Protocol (VoIP) network.

3. The method of claim 1, wherein said registering comprises:
    receiving said service impacting network event alarm from at least one network element in said communication network.

4. The method of claim 3, wherein said service impacting network event alarm is received by a network management system (NMS).

5. The method of claim 1, wherein said network announcement is created automatically.

6. The method of claim 5, wherein said network announcement is automatically created by a media server (MS).

7. The method of claim 1, wherein said network announcement is updated on an on-demand basis by a network technician who is addressing said service impacting network event alarm.

8. The method of claim 1, further comprising:
    sending information pertaining to said network announcement to a network customer service agent.

9. The method of claim 8, wherein said information pertaining to said service impacting network event is sent to said network customer service agent via at least one of: an email message, an interactive voice response message, a pager message, and a facsimile.

10. The method of claim 1, wherein said network announcement is presented by a media server (MS) to said calling party.

11. A computer-readable medium having stored thereon a plurality of instructions, the plurality of instructions including instructions which, when executed by a processor, cause the processor to perform the steps of a method for providing network announcements in a communication network, comprising:
    registering a service impacting network event alarm in said communication network;
    creating a network announcement associated with said service impacting network event alarm;
    receiving a call setup message to a customer service number from a calling party; and
    presenting said network announcement containing information about said service impacting network event alarm to said calling party in response to receiving said call setup message.

12. The computer-readable medium of claim 11, wherein said communication network is a Voice over Internet Protocol (VoIP) network.

13. The computer-readable medium of claim 11, wherein said registering comprises:
    receiving said service impacting network event alarm from at least one network element in said communication network.

14. The computer-readable medium of claim 13, wherein said service impacting network event alarm is received by a network management system (NMS).

15. The computer-readable medium of claim 11, wherein said network announcement is created automatically.

16. The computer-readable medium of claim 15, wherein said network announcement is automatically created by a media server (MS).

17. The computer-readable medium of claim 11, wherein said network announcement is updated on an on-demand basis by a network technician who is addressing said service impacting network event alarm.

18. The computer-readable medium of claim 11, further comprising:

sending information pertaining to said network announcement to a network customer service agent.

19. The computer-readable medium of claim 18, wherein said information pertaining to said service impacting network event is sent to said network customer service agent via at least one of: an email message, an interactive voice response message, a pager message, and a facsimile.

20. A system for providing network announcements in a communication network, comprising:

means for registering a service impacting network event alarm in said communication network;

means for creating a network announcement associated with said service impacting network event alarm;

means for receiving a call setup message to a customer service number from a calling party; and means for presenting said network announcement containing information about said service impacting network event alarm to said calling party in response to receiving said call setup message.

* * * * *